United States Patent
Biellak et al.

(10) Patent No.: US 10,690,599 B1
(45) Date of Patent: Jun. 23, 2020

(54) RADIATION-INDUCED FALSE COUNT MITIGATION AND DETECTOR COOLING

(71) Applicant: KLA-Tencor Corporation, Milpitas, CA (US)

(72) Inventors: Stephen Biellak, Sunnyvale, CA (US); Tyler Trytko, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/170,954

(22) Filed: Oct. 25, 2018

Related U.S. Application Data

(60) Provisional application No. 62/680,767, filed on Jun. 5, 2018.

(51) Int. Cl.
| | |
|---|---|
| *G01N 21/88* | (2006.01) |
| *G01T 1/24* | (2006.01) |
| *G01N 21/95* | (2006.01) |

(52) U.S. Cl.
CPC ..... *G01N 21/8806* (2013.01); *G01N 21/9501* (2013.01); *G01T 1/248* (2013.01)

(58) Field of Classification Search
CPC . G01N 21/8806; G01N 21/9501; G01T 1/248
USPC ............. 356/237.1–237.6, 239.1–239.8, 356/243.2–243.8, 244–255, 432–444, 356/388–398; 250/336.1–395
See application file for complete search history.

(56) References Cited

U.S. PATENT DOCUMENTS

| | | | |
|---|---|---|---|
| 9,841,512 | B2 | 12/2017 | Jiang et al. |
| 2018/0045837 | A1 | 2/2018 | Jiang et al. |

FOREIGN PATENT DOCUMENTS

| | | |
|---|---|---|
| CN | 107533147 A | 1/2018 |
| DE | 112016002184 T5 | 1/2018 |
| JP | 2018518668 A | 7/2018 |
| KR | 20170142202 A | 12/2017 |
| TW | 201706624 A | 2/2017 |
| WO | 2016183194 A1 | 11/2016 |

*Primary Examiner* — Tri T Ton
(74) *Attorney, Agent, or Firm* — Suiter Swantz pc llo

(57) ABSTRACT

An inspection system with radiation-induced false count mitigation includes an illumination source configured to illuminate a sample and a liquid-cooling coincidence detector, which includes an illumination detector to detect illumination from the sample, a liquid-cooling device for regulating a temperature of the illumination detector via a liquid, and photodetectors to detect light generated in the liquid in response to particle radiation. The liquid-cooling coincidence detector may also include controllers to identify a set of illumination detection events based on an illumination signal received from the illumination detector, identify a set of radiation detection events based on radiation signals received from the photodetectors, compare the set of radiation detection events to the set of illumination detection events to identify a set of coincidence events, and exclude the set of coincidence events from the set of illumination detection events to generate a set of identified features on the sample.

42 Claims, 9 Drawing Sheets

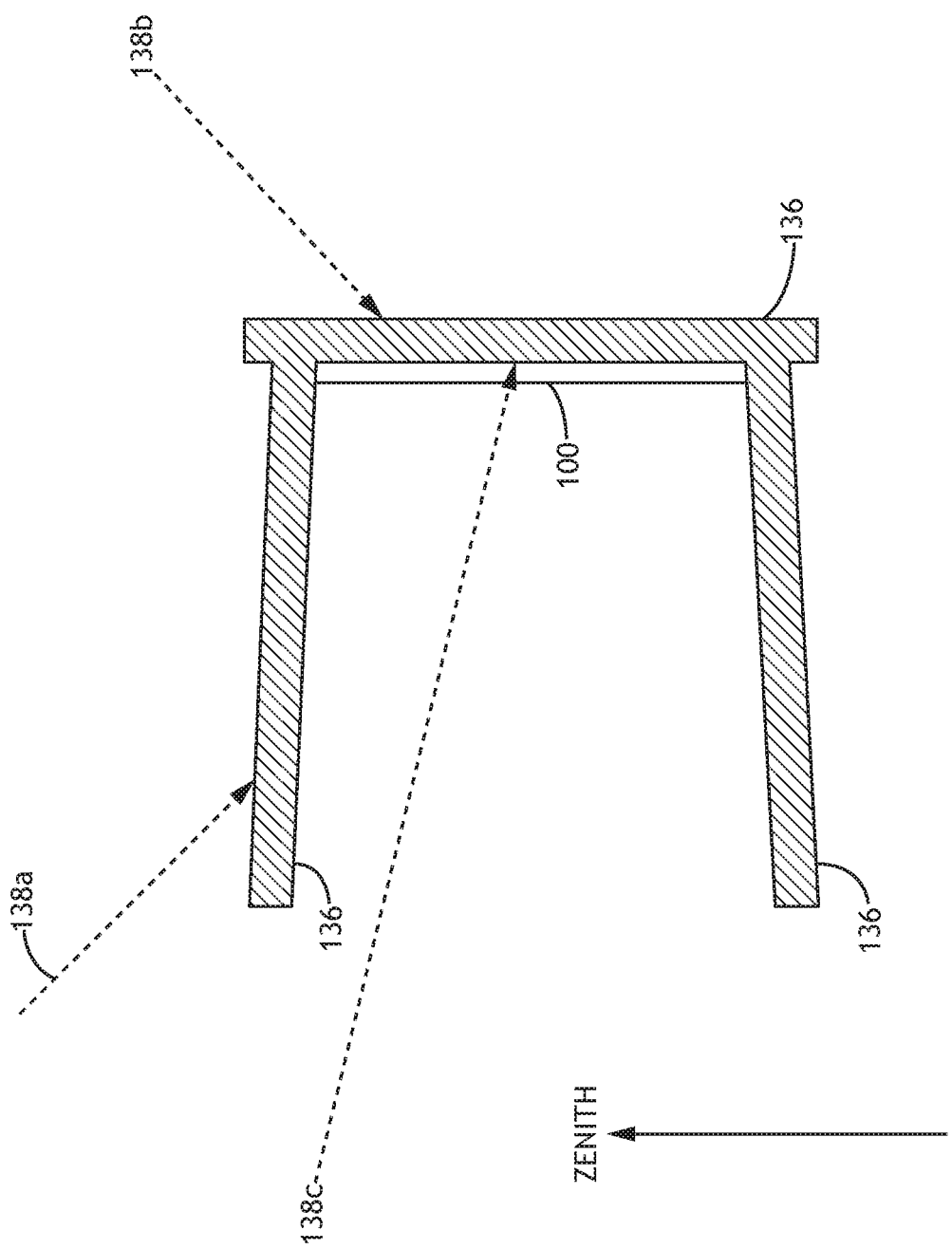

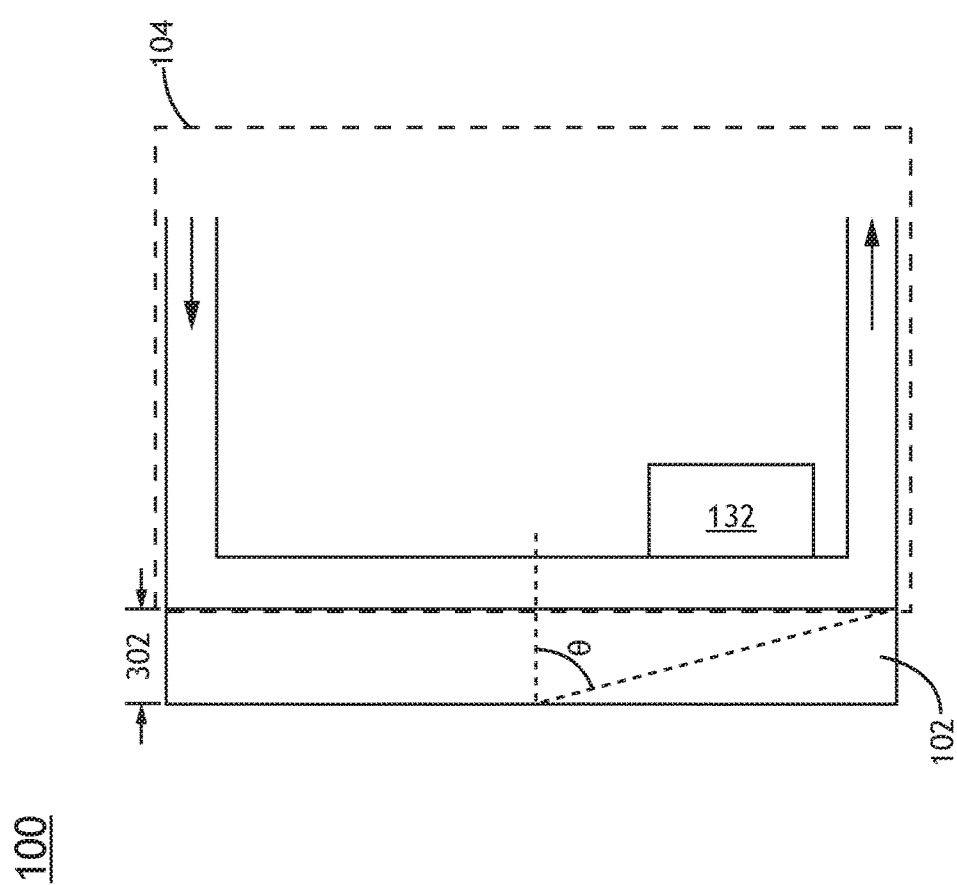

RADIATION-INDUCED FALSE COUNT MITIGATION AND DETECTOR COOLING

CROSS-REFERENCE TO RELATED APPLICATION

The present application claims the benefit under 35 U.S.C. § 119(e) of U.S. Provisional Application Ser. No. 62/680,767, filed Jun. 5, 2018, entitled "Liquid Cooler Based Coincident Detection System for Rejection of Inspection System False Counts", naming Stephen Biellak and Tyler Trytko as inventors, which is incorporated herein by reference in the entirety.

TECHNICAL FIELD

The present disclosure relates generally to the field of noise reduction in inspection systems, and, in particular, to the reduction of noise associated with particle radiation in wafer inspection systems.

BACKGROUND

False positives, or false counts, are undesirable in any inspection application. False counts can arise from multiple sources such as, but not limited to, electronic noise associated with detectors in the system as well as external noise associated with photons or radiative particles from sources other than the sample of interest. In the context of inspection systems, a false count occurs when a signal not associated with a sample is detected by one or more detectors and is incorrectly associated with properties of the sample. Radiation sources that may affect the false count rate of an inspection system may include, but are not limited to, a decay of trace levels of radioactive isotopes near the inspection system as well as high-energy cosmic radiation by-products generated in the atmosphere. These radiation sources may produce radiative particles and/or photons including, but not limited to, alpha particles, beta particles, neutrons, muons, and gamma rays. For example, muons are primarily generated as a by-product of the interaction of cosmic radiation with the atmosphere. Radiative particles can also be generated through inelastic scattering from materials in close proximity to the inspection system.

Advances in the application of multi-pixel detectors in inspection systems have resulted in increased conversion gain and lower noise readout electronics. However, these advances have also resulted in increased sensitivity to the detection of particle radiation, such as muons, gamma particles, and alpha particles, to name a few. Therefore, it is desirable to provide a method and system that cures the defects identified above in previous approaches.

SUMMARY

An inspection system with radiation-induced false count mitigation is disclosed in accordance with one or more illustrative embodiments of the present disclosure. In one illustrative embodiment, the system includes an illumination source configured to illuminate a sample. In another illustrative embodiment, the system includes a liquid-cooling coincidence detector. In another illustrative embodiment, the liquid-cooling coincidence detector includes an illumination detector configured to detect illumination from the sample positioned on a first side of the illumination detector. In another illustrative embodiment, the liquid-cooling coincidence detector includes a liquid-cooling device for regulating a temperature of the illumination detector via a liquid circulating through one or more channels disposed on a second side of the illumination detector opposite the first side of the illumination detector. In another illustrative embodiment, the liquid-cooling coincidence detector includes one or more photodetectors configured to detect photons generated in the liquid in response to particle radiation. In another illustrative embodiment, the system includes one or more controllers communicatively coupled to the illumination detector and the one or more photodetectors. In another illustrative embodiment, the controllers identify a set of illumination detection events based on an illumination signal received from the illumination detector. In another illustrative embodiment, the controllers identify a set of radiation detection events based on one or more radiation signals received from the one or more photodetectors. In another illustrative embodiment, the controllers compare the set of radiation detection events to the set of illumination detection events to identify a set of coincidence events, where the set of coincidence events corresponds to simultaneous occurrences of radiation detection events and illumination detection events. In another illustrative embodiment, the controllers exclude the set of coincidence events from the set of illumination detection events to generate a set of identified features on the sample.

An inspection system with radiation-induced false count mitigation is disclosed in accordance with one or more illustrative embodiments of the present disclosure. In one illustrative embodiment, the system includes an illumination source configured to illuminate a sample. In another illustrative embodiment, the system includes a liquid-cooling detector. In another illustrative embodiment, the liquid-cooling detector includes an illumination detector configured to detect illumination from the sample positioned on a first side of the illumination detector. In another illustrative embodiment, the liquid-cooling detector includes a liquid-cooling device for regulating a temperature of the illumination detector via a liquid circulating through one or more channels disposed proximate to a second side of the illumination detector opposite the first side of the illumination detector. In another illustrative embodiment, the liquid-cooling detector includes one or more photodetectors configured to detect photons generated in the liquid in response to particle radiation. In another illustrative embodiment, the system includes one or more controllers communicatively coupled to the illumination detector and the one or more photodetectors. In another illustrative embodiment, the controllers identify a set of radiation detection events based on one or more radiation signals received from the one or more photodetectors. In another illustrative embodiment, the controllers generate a set of radiation detection event timestamps associated with the set of radiation detection events. In another illustrative embodiment, the controllers identify a set of illumination detection events based on the illumination signal received from the illumination detector. In another illustrative embodiment, the controllers generate a set of illumination detection event timestamps associated with the set of imaging events. In another illustrative embodiment, the controllers compare the set of illumination detection event timestamps to the set of radiation detection event timestamps to generate a set of coincidence events, where the set of coincidence events comprises illumination detection events and radiation detection events with matching timestamps. In another illustrative embodiment, the controllers exclude the set of coincidence events from the set of illumination detection events to generate a set of identified features on the sample.

A method for reducing radiation-induced false counts on a detector in an inspection system is disclosed in accordance with one or more illustrative embodiments of the present disclosure. In one illustrative embodiment, the method includes identifying, with an illumination detector, a set of illumination detection events based on the illumination signal received from a sample, wherein the sample is positioned on a first side of the illumination detector. In another illustrative embodiment, the method includes regulating a temperature of the illumination detector with a liquid-cooling device via a liquid circulating through one or more channels disposed proximate to a second side of the illumination detector opposite the first side of the illumination detector. In another illustrative embodiment, the method includes identifying a set of radiation detection events based on one or more radiation signals received from one or more photodetectors configured to detect light generated in the liquid in response to particle radiation. In another illustrative embodiment, the method includes comparing the set of illumination detection event timestamps to the set of radiation detection event timestamps to generate a set of coincidence events, where the set of coincidence events corresponds to simultaneous occurrences of radiation detection events and illumination detection events. In another illustrative embodiment, the method includes excluding the set of coincidence events from the set of illumination detection events to generate a set of identified defect sites on the sample.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 1D is a conceptual view of a liquid-cooling coincidence detector including one or more radiation shields, in accordance with one or more embodiments of the present disclosure.

FIG. 3 is a conceptual view of the liquid-cooling coincidence detector illustrating the impact of the orientation of the illumination detector and the radiation sensor, in accordance with one or more embodiments of the present disclosure.

DETAILED DESCRIPTION

Figure 1A:
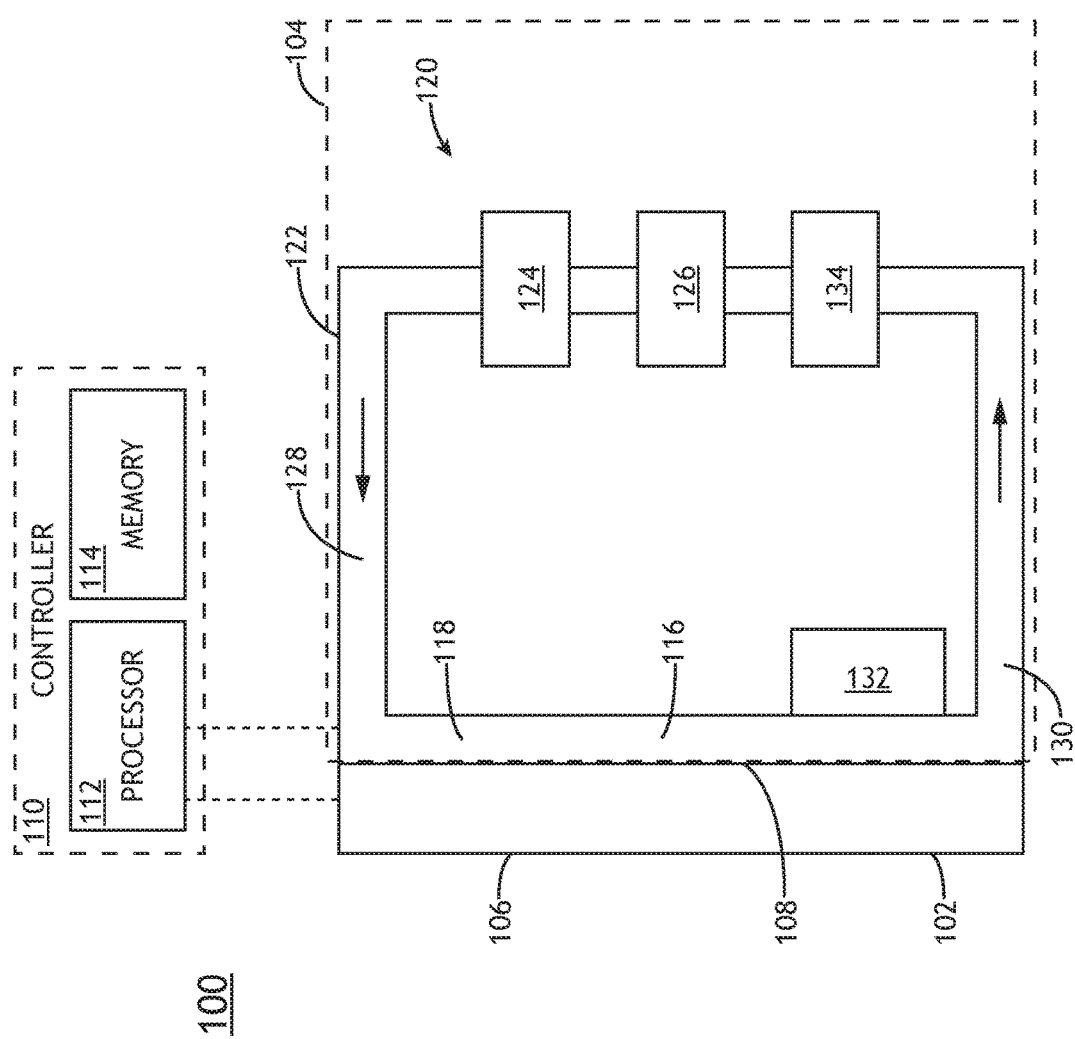
FIG. 1A is a conceptual view of a liquid-cooling coincidence detector with radiation-induced false count mitigation capabilities, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1A through 5, a system and method for reducing false counts in an inspection system are described in accordance with one or more embodiments of the disclosure.

High-sensitivity detectors such as, but not limited to, semiconductor-based detectors used in inspection systems may be susceptible to false counts induced by incident high-energy radiation. For example, an inspection system may include a detector (e.g., an illumination detector) configured to characterize a sample of interest by capturing an image of the sample, detecting light from the sample, or the like. However, high-energy radiation from sources other than the sample of interest incident on the illumination detector may generate electrical signals that may be otherwise indistinguishable from signals of interest (e.g., associated with a sample being inspected) and may thus contribute to noise or false detection events. Coincidence detection and mitigation systems are generally described in U.S. Pat. No. 9,841,512 titled SYSTEM AND METHOD FOR REDUCING RADIATION-INDUCED FALSE COUNTS IN AN INSPECTION SYSTEM and issued on Dec. 12, 2017, and U.S. Patent Application Publication No. 2018/0045837 titled SYSTEM AND METHOD FOR REDUCING RADIATION-INDUCED FALSE COUNTS IN AN INSPECTION SYSTEM and published on Feb. 15, 2018, both of which are incorporated herein in their entirety. For the purposes of the present disclosure, the terms "radiation," "beam of radiation," "radiation beam," and "particle radiation" may be used interchangeably and generally describe radiative energy in the form of particles and/or photons propagating along a defined path including, but not limited to, alpha particles, beta particles, neutrons, muons, or gamma rays.

The degree to which a detector is sensitive to high-energy radiation is related to multiple factors including, but not limited to, the radiation flux, the detector design, and the operational conditions of the detector. For example, the sensitivity of a Charge Coupled Device (CCD) to radiation sources is in part a function of the charge-to-voltage conversion gain of the device, which describes the voltage induced by the generation of an electron in response to a detected event. In this way, increasing the conversion gain of a CCD increases the sensitivity of the device to any illumination detection event, which may include both the desired signal as well as background noise signals (e.g., radiation detection events). Further, it may be desirable in some applications to operate a detector of any type at a high sensitivity level in order to maximize the resolution and sensitivity of the wafer inspection system to the illumination signal. For instance, a detector in an unpatterned wafer inspection system may be operated at a high sensitivity level in order to detect subtle differences between illumination signals associated with defect regions and non-defect regions. However, operating the detector at a high sensitivity level may correspondingly increase the impact of noise from radiative sources not associated with the sample, which may lead to false counts and/or false detection events.

Embodiments of the present disclosure are directed to a liquid-cooling coincidence detector to mitigate radiation-induced false counts on a detector of interest (e.g., an inspection detector). A liquid-cooling coincidence detector may include a radiation-sensitive liquid that generates light (e.g., photons) in response to incident radiation and one or more photodetectors to measure the generated light. For example, a radiation-sensitive liquid may generate light in response to incident radiation based on the Cherenkov effect, a scintillation process, or the like. In this regard, the photodetectors of the liquid-cooling coincidence detector may generate radiation detection events in response to incident radiation.

Additional embodiments of the present disclosure are directed to attaching a liquid-cooling coincidence detector to an illumination detector (e.g., a sensor of interest) to generate radiation detection events. Further embodiments of the present disclosure are directed to comparing radiation detection events from the liquid-cooling coincidence detector to illumination detection events from the illumination detector. In this regard, signals simultaneously detected on the liquid-cooling coincidence detector and the illumination detector may be attributed to incident high-energy radiation and excluded. The sensitivity and accuracy of the illumination detector may thus be increased by the exclusion of signals known to be generated by high-energy radiation and not from a sample of interest.

It is recognized herein that many detectors such as, but not limited to, high-sensitivity illumination detectors used in inspection systems, require a thermal management system such as, but not limited to, a heat sink to capture and redirect heat generated during operation. Additional embodiments of the present disclosure are directed to regulating the temperature of the illumination detector with the liquid-cooling coincidence detector. For example, the liquid-cooling coincidence detector may circulate the radiation-sensitive liquid through one or more thermally-conductive channels attached to the illumination detector to capture and redirect heat generated by the illumination detector. In this regard, the radiation-sensitive liquid may operate both to generate light in response to incident radiation and to act as a coolant. Accordingly, the liquid-cooling coincidence detector may function as a thermal management system such that additional heat sinks are not required during operation.

A liquid-cooling coincidence detector may facilitate detection of radiation incident on the illumination detector of interest and thus provide accurate false-count mitigation. In general, accurate coincident detection of radiation requires a one-to-one correspondence of an illumination signal generated by the illumination detector of interest and a radiation detection signal generated by a radiation sensor (e.g., the liquid-cooling coincidence detector), which occurs when radiation incident on the illumination detector is also incident on the radiation sensor and vice-versa. Radiation incident on only one of the illumination detector or the radiation sensor may induce errors. It is therefore typically desirable to place a radiation sensor close to the illumination detector to increase the probability that a beam of radiation passing through the illumination detector will also be incident on the radiation sensor. A liquid-cooling coincidence detector providing both radiation detection and thermal management may be placed in direct contact with the illumination detector of interest and may thus provide increased performance relative to a radiation sensor physically separated from the illumination detector sensor (e.g., by a heat sink, or the like).

FIG. 1A is a conceptual view of a liquid-cooling coincidence detector 100 with radiation-induced false count mitigation capabilities, in accordance with one or more embodiments of the present disclosure. In one embodiment, the liquid-cooling coincidence detector 100 includes an illumination detector 102 to generate a desired detection signal (e.g., associated with a sample of interest) and a radiation sensor 104 suitable for detecting external radiation signals (e.g., not associated with a sample of interest). Further, the radiation sensor 104 may be directly in contact with the illumination detector 102 to capture radiation passing through the illumination detector 102 and to further regulate the temperature of the illumination detector 102. In this regard, a beam of radiation incident on the illumination detector 102 may also be incident on the radiation sensor 104 and vice versa. For example, the illumination detector 102 may include a sensor side 106 including one or more pixels for detecting electromagnetic radiation and/or particles. The radiation sensor 104 may thus be in contact with a back side 108 of the illumination detector 102 so as to avoid interference with the operation of the illumination detector 102.

In another embodiment, the liquid-cooling coincidence detector 100 includes a controller 110 including one or more processors 112 and a memory medium 114, or memory. In another embodiment, the one or more processors 112 are configured to execute a set of program instructions maintained in the memory medium 114. In this regard, the controller 110 may carry out one or more process steps disclosed herein such as, but not limited to, performing coincidence detection based on signals from the illumination detector 102 and the radiation sensor 104. For example, the controller 110 may receive illumination detection events from the illumination detector 102, receive radiation detection events from the radiation sensor 104, identify coincidence events corresponding to simultaneous illumination and radiation detection events, and exclude coincidence events from the illumination detection events.

The one or more processors 112 of a controller 110 may include any processing element known in the art. In this sense, the one or more processors 112 may include any microprocessor-type device configured to execute algorithms and/or instructions. In one embodiment, the one or more processors 112 may consist of a desktop computer, mainframe computer system, workstation, image computer, parallel processor, or any other computer system (e.g., networked computer) configured to execute a program configured to operate the inspection system 200, as described throughout the present disclosure. It is further recognized that the term "processor" may be broadly defined to encompass any device having one or more processing elements, which execute program instructions from a non-transitory memory medium 114. Therefore, the above description should not be interpreted as a limitation on the present invention but merely an illustration.

The memory medium 114 may include any storage medium known in the art suitable for storing program instructions executable by the associated one or more processors 112. By way of a non-limiting example, the memory medium 114 may include a non-transitory memory medium. By way of additional non-limiting examples, the memory medium 114 may include, but is not limited to, a read-only memory, a random access memory, a magnetic or optical memory device (e.g., disk), a magnetic tape, a solid state drive and the like. It is further noted that memory medium 114 may be housed in a common controller housing with the one or more processors 112. In another embodiment, the memory medium 114 may be located remotely with respect to the physical location of the one or more processors 112 of controller 110. For instance, the one or more processors 112 of controller 110 may access a remote memory (e.g., server), accessible through a network (e.g., internet, intranet and the like).

The illumination detector 102 may include any type of detector known in the art suitable for detecting particles or electromagnetic radiation (e.g., photons). For example, the illumination detector 102 may include a single pixel sensor such as, but not limited to, a photodiode, a photo-multiplier tube (PMT), or an avalanche photodiode (APD). By way of another example, the illumination detector 102 may include a multiple pixel sensor suitable for imaging including, but not limited to, a CCD or a complementary metal-oxide semiconductor (CMOS) device. By way of a further example, the illumination detector 102 may include a particle detector such as, but not limited to, an electron detector.

In one embodiment, the radiation sensor 104 includes one or more channels 116 for containing a radiation-sensitive liquid 118. The radiation-sensitive liquid 118 may include any liquid suitable for generating light (e.g., photons) in response to incident radiation (e.g., muons, alpha particles, beta particles, gamma rays, or the like) such as, but not limited to, water. Further, the radiation-sensitive liquid 118 may generate light in response to incident radiation by any process known in the art. For example, the radiation-sensitive liquid 118 may generate light based on the Cherenkov effect in which light is directly generated by high-energy radiation traveling faster than the phase velocity light in the liquid. It is recognized herein that Cherenkov radiation may generally occur for any medium having a refractive index greater than 1 such that any liquid medium may be used as the radiation-sensitive liquid 118. Further, the larger the refractive index, the slower the speed of light in the medium. Accordingly, a relatively high-index liquid may provide a larger window for detection of particle radiation than a relatively low-index liquid. By way of another example, the radiation-sensitive liquid 118 may generate light in response to radiation through scintillation. In this regard, the radiation-sensitive liquid 118 may absorb the radiation and re-emit photons having a lower energy than the absorbed radiation. In another embodiment, the radiation-sensitive liquid 118 is at least partially transparent to light generated in response to incident radiation. In this regard, the light may propagate through the radiation-sensitive liquid 118.

In another embodiment, the liquid-cooling coincidence detector 100 includes a circulation system 120 for flowing the radiation-sensitive liquid 118 through the channels 116. The circulation system 120 may include any type of components suitable for flowing the radiation-sensitive liquid 118 such as, but not limited to, one or more conduits 122 (e.g., tubes, hoses, or the like), one or more pumps 124, or one or more reservoirs 126. In this regard, the circulation system 120 may direct the radiation-sensitive liquid 118 into the one or more channels 116 through an inlet 128 and receive the radiation-sensitive liquid 118 from an outlet 130.

In another embodiment, the radiation sensor 104 includes a photodetector 132 to measure light generated by the radiation-sensitive liquid 118 in response to incident radiation. For example, light generated in response to incident radiation may propagate through the radiation-sensitive liquid 118 for detection by the photodetector 132. In some cases, at least a portion of the light generated in response to incident radiation may undergo total internal reflection at one or more boundaries of the radiation-sensitive liquid 118 (e.g., associated with the boundaries of the one or more channels 116), which may provide for efficient detection by the photodetector 132. Further, the radiation-sensitive liquid 118 may operate as a waveguide to facilitate transmission of the light to the photodetector 132.

The photodetector 132 may include any type of detector known in the art suitable for detecting light generated by the radiation-sensitive liquid 118 in response to incident radiation. In one embodiment, the photodetector 132 includes one or more photodiodes suitable for detecting wavelengths associated with the light generated by the radiation-sensitive liquid 118 in response to incident radiation. In another embodiment, the photodetector 132 includes a high-gain device for capturing weak signals to provide sensitive detection of incident radiation. For example, the photodetector 132 may include, but is not limited to, a photo-multiplier tube (PMT), a silicon photomultiplier (SiPM), an avalanche photodiode (APD), a photon counter, or a multi-pixel photon counter (MPPC).

The photodetector 132 may be placed at any location suitable for detecting light generated by the radiation-sensitive liquid 118 in response to incident radiation. In one embodiment, a channel 116 is formed from a material transparent to the light generated in response to incident radiation such that the photodetector 132 may detect the light through the walls of the channel 116. In another embodiment, a channel 116 may include a window transparent to the light generated in response to incident radiation such that the photodetector 132 may detect the light through the window.

The one or more channels 116 of the radiation sensor 104 may additionally be arranged to promote efficient detection of the light generated in response to incident radiation. In one embodiment, walls of the one or more channels 116 (or portions thereof) may be formed from a polished (e.g., highly reflective) material to facilitate reflection of the light generated in response to incident radiation and for efficient detection by the photodetector 132. Further, the radiation sensor 104 may include any number of channels 116 for containing the radiation-sensitive liquid 118 and any number of photodetectors 132 for detecting light generated in response to incident radiation. For example, signals from multiple photodetectors 132 may be summed to generate a radiation detection signal based on each of the photodetectors 132. By way of another example, signals from multiple photodetectors 132 may provide spatial sensitivity for radiation detection.

Figure 1B:
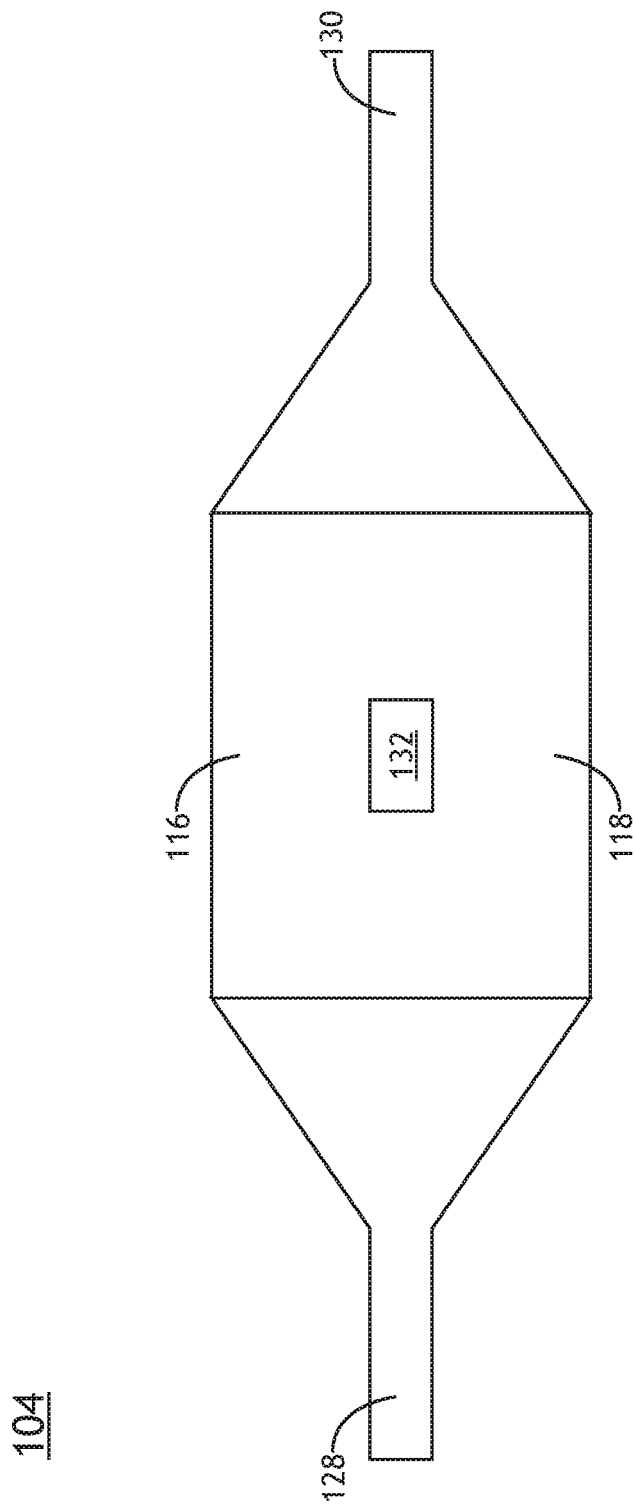
FIG. 1B is a top view of a radiation sensor including a single wide channel and a single photodetector, in accordance with one or more embodiments of the present disclosure.
Figure 1C:
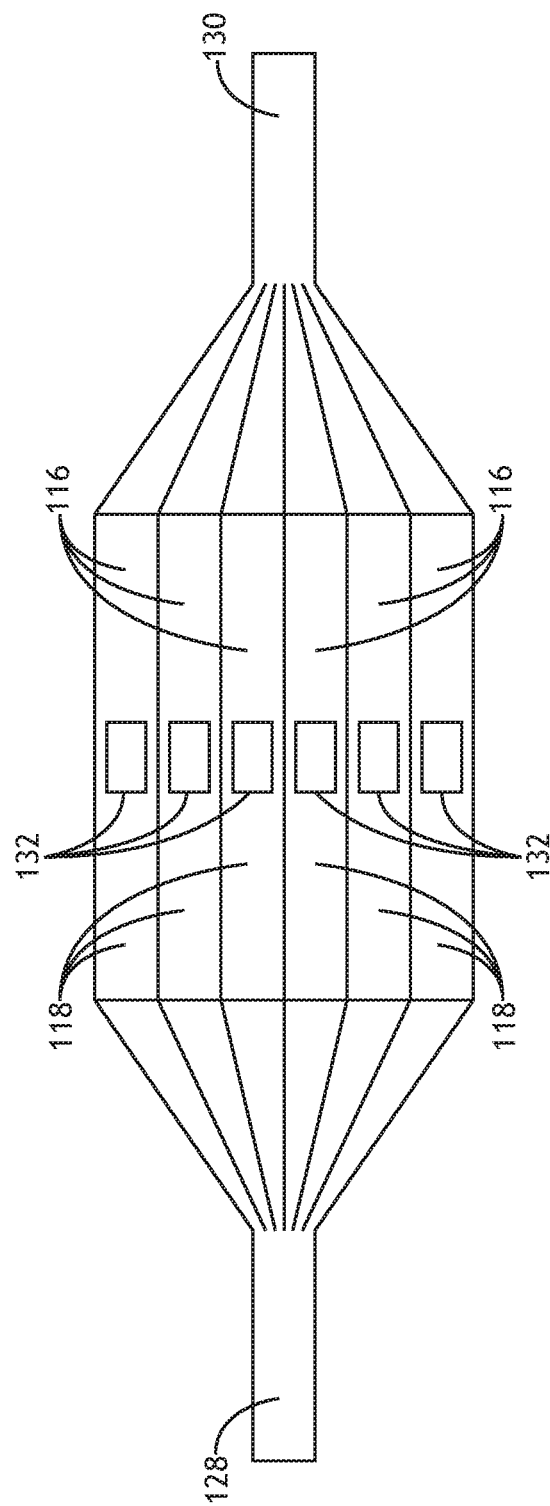
FIG. 1C is a top view of a radiation sensor including multiple channels and multiple photodetectors, in accordance with one or more embodiments of the present disclosure.

Referring now to FIGS. 1B through 1D, non-limiting arrangements of channels 116 and photodetectors 132 are illustrated. In the examples illustrated in FIGS. 1B through 1C, the radiation sensor 104 includes one or more channels 116 mounted to a back-side of an illumination detector 102 (below the one or more channels 116 in the figures).

FIG. 1B is a top view of a radiation sensor 104 including a single wide channel 116 and a single photodetector 132, in accordance with one or more embodiments of the present disclosure. For example, radiation-sensitive liquid 118 entering the inlet 128 may be spread to a channel 116 spanning the width of the illumination detector 102. In this regard, the radiation-sensitive liquid 118 may detect incident radiation along the entire backside face of the illumination detector 102. Further, the radiation sensor 104 may include one or more photodetectors 132 distributed along the channel 116 to detect light at one or more points along the channel 116.

FIG. 1C is a top view of a radiation sensor 104 including multiple channels 116 and multiple photodetectors 132, in accordance with one or more embodiments of the present disclosure. For example, radiation-sensitive liquid 118 entering the inlet 128 may be split into multiple channels 116 arranged to span the width of the illumination detector 102. Further, as illustrated in FIG. 1C, one or more photodetectors 132 may be positioned along each channel 116 to detect light generated in response to radiation incident on radiation-sensitive liquid 118 within each channel 116.

Referring again to FIG. 1A, the radiation sensor 104 may be in thermal contact with the illumination detector 102 such that the radiation sensor 104 may regulate the temperature of the illumination detector 102. For example, the one or more channels 116 of the radiation sensor 104 may be formed from a thermally conductive material (e.g., a metal, or the like) and thermally coupled to the backside of the illumination detector 102. In this regard, heat generated by the illumination detector 102 (e.g., during operation) may be transferred to the radiation-sensitive liquid 118. In another embodiment, the liquid-cooling coincidence detector 100 includes a thermal regulator 134 to regulate the temperature of the radiation-sensitive liquid 118 and thus regulate the temperature of the illumination detector 102. The thermal regulator 134 may regulate the temperature of the radiation-sensitive liquid 118 using any technique known in the art. For example, the thermal regulator 134 may include a heat sink to dissipate heat. By way of another example, the thermal regulator 134 may include an extended portion of the circulation system 120 exposed to external air. In this regard, heat may be dissipated merely by flowing through the extended portion of the circulation system 120.

FIG. 1D is a conceptual view of a liquid-cooling coincidence detector 100 including one or more radiation shields 136, in accordance with one or more embodiments of the present disclosure. In one embodiment, the radiation shields 136 absorb or redirect radiation such that the radiation does not reach the illumination detector 102 or the radiation sensor 104. In this regard, the radiation shields 136 may limit the quantity of radiation available to produce false counts and thus provide highly sensitive detection of intended signals on the illumination detector 102. For example, as illustrated in FIG. 1D, the radiation shields 136 may block radiation beams 138*a* and 138*b* from reaching the liquid-cooling coincidence detector 100. Accordingly, the radiation shields 136 may limit the radiation that may be incident on the illumination detector 102 that may produce a false count to radiation beams having a path through an open area (e.g., radiation beam 138*c*) provided to admit desired light (e.g., light from a sample of interest).

The one or more radiation shields 136 may be formed from any material known in the art suitable for preventing background radiation from reaching the liquid-cooling coincidence detector 100. In one embodiment, the radiation shields 136 are formed from one or more heavy elements.

For example, the radiation shields 136 may be, but are not required to be, formed from at least one of lead, tungsten, antimony, tin, or bismuth. It is noted herein that the thickness of the one or more radiation shields may be adjusted according to material properties to block radiation from reaching the liquid-cooling coincidence detector 100. The one or more radiation shields 136 may be further configured as structural or functional components in a liquid-cooling coincidence detector 100. For example, the one or more radiation shields 136 may be configured to stabilize or position the liquid-cooling coincidence detector 100. In another embodiment, the one or more radiation shields 136 are integrated into a mounting package (e.g., a ceramic mounting package) attaching the liquid-cooling coincidence detector 100 to additional components of the inspection system 200.

Figure 2A:
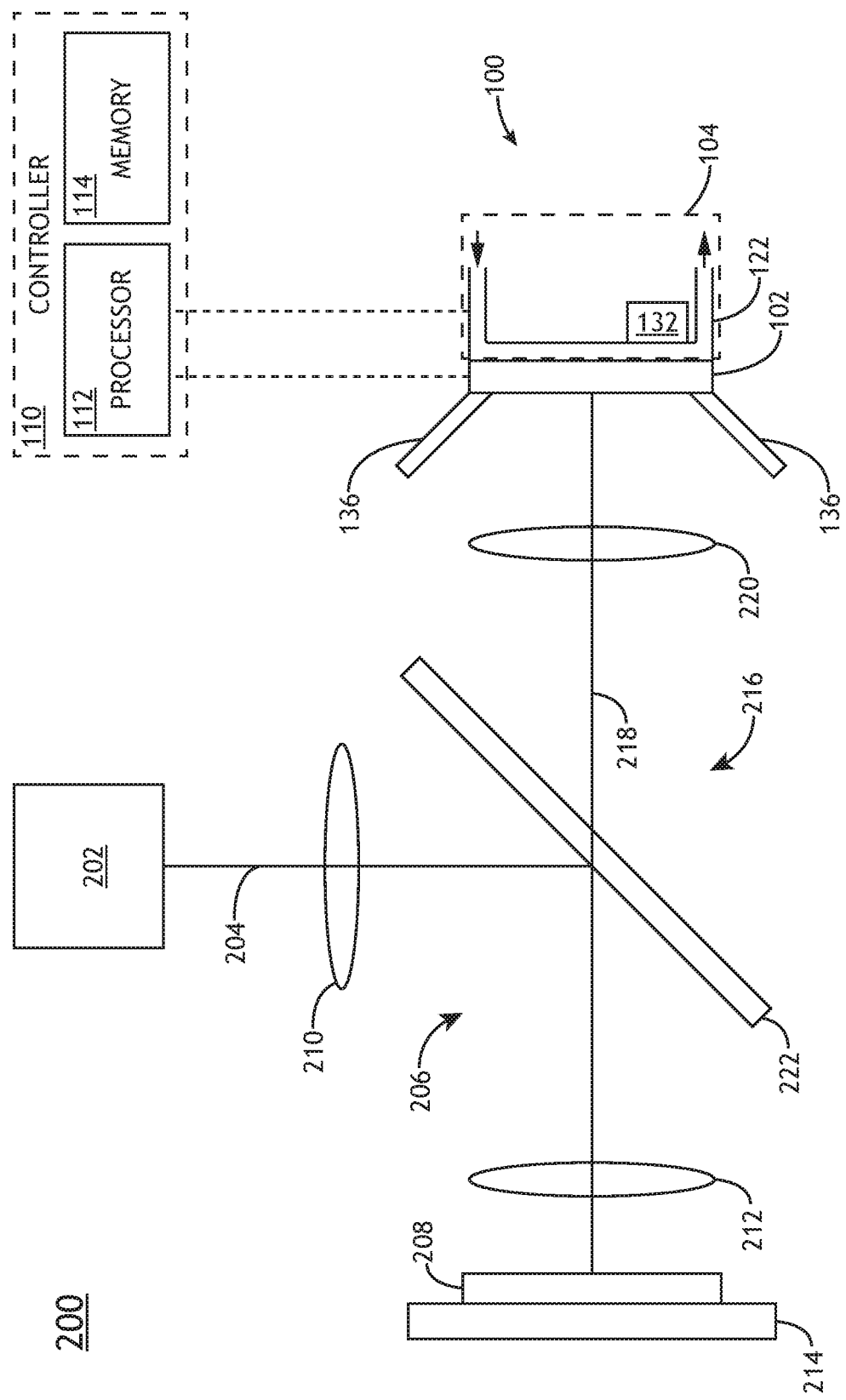
FIG. 2A is a conceptual view of an inspection system including a liquid-cooling coincidence detector, in accordance with one or more embodiments of the present disclosure.

Referring now to FIG. 2A, the liquid-cooling coincidence detector 100 may be, but is not required to be, implemented in an external system. FIG. 2A is a conceptual view of an inspection system 200 including a liquid-cooling coincidence detector 100, in accordance with one or more embodiments of the present disclosure.

In one embodiment, the inspection system 200 includes an illumination source 202 configured to generate an illumination beam 204. The illumination source 202 is configured to generate an illumination beam 204 including a selected wavelength or a wavelength range such as, but not limited to, ultraviolet (UV), extreme ultraviolet (EUV), deep ultraviolet (DUV), vacuum ultraviolet light (VUV), visible, or infrared (IR) wavelengths of light. For example, the illumination source 202 may include any source capable of emitting illumination in the range of approximately 100 nm to 450 nm. For example, the illumination source 202 may include, but is not limited to, a narrow band source (e.g., laser source) or a broadband source (e.g., a Laser Sustained Plasma (LSP) source, a discharge lamp, or the like). By way of non-limiting example, the illumination source 202 may be a UV laser (e.g., an excimer laser or the like) with an output wavelength of 266 nm.

In one embodiment, the inspection system 200 includes an illumination pathway 206 for directing at least a portion of the illumination beam 204 to a sample 208. The illumination pathway 206 may include any number and type of optical elements suitable for delivering the illumination beam 204 from the output of the illumination source 202 to the surface of the sample 208. For example, the illumination pathway 206 may include, but is not limited to, one or more lenses 210, one or more collimating elements (not shown), one or more filters (not shown), one or more polarizing elements (not shown) or one or more focusing elements for directing, focusing, and otherwise processing illumination emitted by the illumination source 202. By way of another example, the inspection system 200 includes an objective lens 212 to direct the illumination beam 204 to the sample 208.

In another embodiment, the inspection system 200 includes a stage assembly 214 suitable for securing and positioning a sample 208. The stage assembly 214 may include any sample stage architecture known in the art. By way of a non-limiting example, the stage assembly 214 may include a linear stage. By way of another example, the stage assembly 214 may include a rotational stage. The sample 208 may include a wafer, such as, but not limited to, an unpatterned semiconductor wafer.

In one embodiment, the inspection system 200 includes an imaging pathway 216 configured to direct illumination from the sample 208 to a liquid-cooling coincidence detector

100. For example, a radiation sensor 104 may be positioned proximate to an illumination detector 102 and further positioned such that illumination from the sample 208 is incident only on the illumination detector 102. In one instance, the radiation sensor 104 may be placed on an opposite side of the illumination detector 102 than a side including pixels of the illumination detector 102.

In one embodiment, the imaging pathway 216 includes an imaging pathway 216 to direct imaging light 218 from the sample 208 to the liquid-cooling coincidence detector 100. For example, the objective lens 212 may collect imaging light 218 from the sample. Further, one or more lenses 220 are configured to generate an image of the sample 208 on the illumination detector 102 based on the imaging light 218. In one embodiment, the inspection system 200 includes a beam splitter 222 positioned to overlap at least a portion of the illumination pathway 206 and the imaging pathway 216. In this way, an objective lens 212 may simultaneously focus the illumination beam 204 onto the sample 208 and collect the imaging light 218 from the sample 208. It is noted herein that the beam splitter 222 is not intended to be limiting and need not be present in all embodiments of the present disclosure. In another embodiment, the illumination pathway 206 and the imaging pathway 216 are non-collinear and include independent optical elements.

Figure 2B:
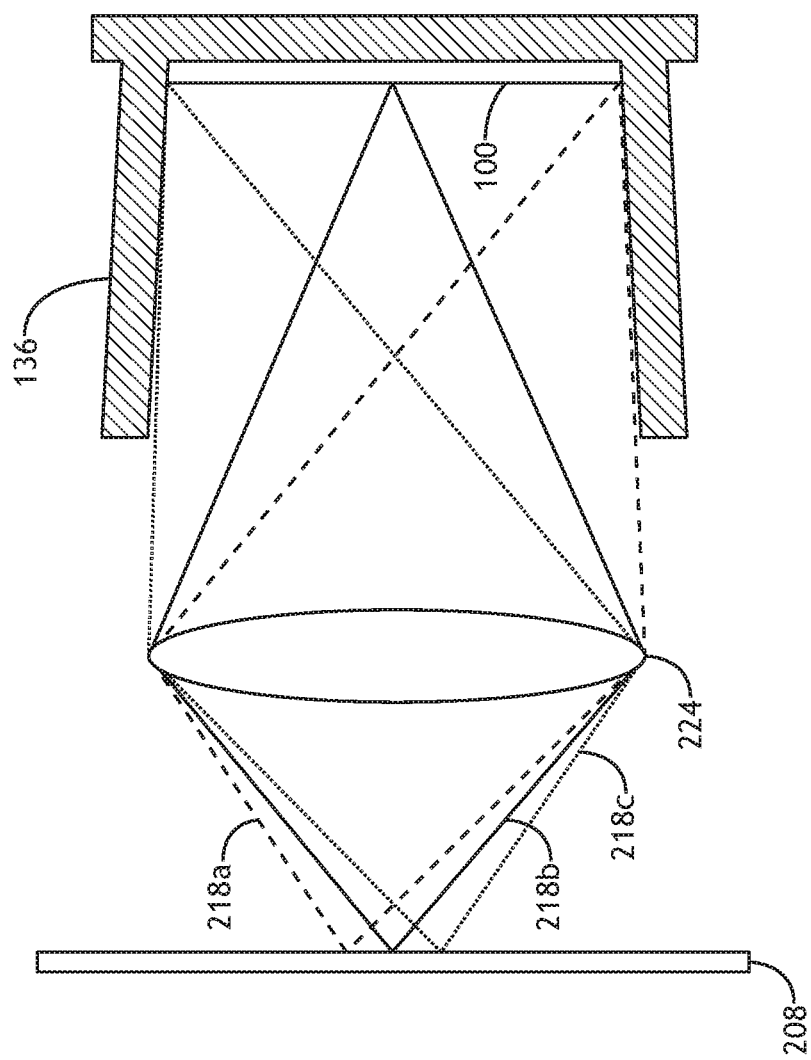
FIG. 2B is a schematic diagram illustrating the positioning of radiation shields to block radiation from solid angles not associated with imaging light from a sample, in accordance with one or more embodiments of the present disclosure.

In one embodiment, one or more radiation shields 136 are positioned to block radiation from all solid angles not associated with imaging light 218. FIG. 2B is a schematic diagram illustrating the positioning of radiation shields 136 to block radiation from solid angles not associated with imaging light 218 from a sample 208, in accordance with one or more embodiments of the present disclosure. In one embodiment, one or more imaging lenses 224 (e.g., objective lens 212, lenses 220, or the like) generate an image of the sample 208 on the illumination detector 102. Imaging rays 218a, 218b, and 218c represent imaging illumination from the entire field of view of the imaging system; specifically rays 218a and 218c represent rays covering the solid angle of the illumination detector 102 associated with imaging light 218. In one embodiment, one or more radiation shields 136 are positioned in a rotationally symmetric configuration around the illumination detector 102. For example, radiation beams 138a and 138b from FIG. 1D may be blocked by this configuration. In another embodiment, one or more radiation shields 136 are positioned behind the liquid-cooling coincidence detector 100 in order to block beams of radiation (e.g., radiation beam 138a from FIG. 1D) incident from an end of the liquid-cooling coincidence detector 100 opposite the sample 208.

As described previously herein, some sources of radiation may interact with the illumination detector 102 despite the presence of radiation shields 136. For example, beams of radiation with paths within the solid angle associated with imaging light 218 (e.g., radiation beam 138c from FIG. 1D) may interact with the illumination detector 102. By way of a second non-limiting example, high energy radiation sources including, but not limited to, muons or gamma rays may propagate through one or more radiation shields 136 and may interact with the illumination detector 102. Accordingly, the radiation sensor 104 may provide coincident detection of radiation incident on the illumination detector 102 to identify and mitigate false counts associated with the incident radiation.

FIG. 3 is a conceptual view of the liquid-cooling coincidence detector 100 illustrating the impact of the orientation of the illumination detector 102 and the radiation sensor 104, in accordance with one or more embodiments of the present disclosure. In one embodiment, the radiation sensor 104 (e.g., the one or more channels 116 containing the radiation-sensitive liquid 118) is positioned in contact with the illumination detector 102. In this regard, beams of radiation within a range of solid angles θ are incident on both the illumination detector 102 and the radiation sensor 104. It is noted herein that the relative size and position of the radiation sensor 104 proximate to an illumination detector 102 will determine the degree to which beams of radiation passing through the illumination detector 102 may be detected by the radiation sensor 104. For example, the range of solid angles θ over which radiation is incident on both the illumination detector 102 and the radiation sensor 104 may be increased by increasing the size of the active area of the radiation sensor 104 relative to the active area of the illumination detector 102, decreasing the distance between the radiation sensor 104 and the illumination detector 102, and/or decreasing a thickness 302 of the illumination detector 102.

Accordingly, a liquid-cooling coincidence detector 100 including a radiation sensor 104 in direct contact with a backside of an illumination detector 102 as described herein may provide a large range of solid angles θ over which radiation is incident on both the illumination detector 102 and the radiation sensor 104 and thus provide accurate false-count mitigation. In particular, a liquid-cooling coincidence detector 100 including a radiation sensor 104 in direct contact with a backside of an illumination detector 102 providing thermal regulation of the illumination detector 102 as well as false-count mitigation as described herein may provide a larger range of solid angles θ over which radiation is incident on both the illumination detector 102 and the radiation sensor 104 than configurations in which the radiation sensor 104 is separated from the illumination detector 102 (e.g., to facilitate placement of a heat sink on the illumination detector 102 located between the illumination detector 102 and the radiation sensor 104).

It is further recognized herein that the radiation flux of high energy radiation associated with by-products of cosmic rays (e.g., muons) is not uniform and is maximum near the zenith. Accordingly, the liquid-cooling coincidence detector 100 may be, but is not required to be, oriented such that the illumination detector 102 is parallel to the zenith as illustrated in FIG. 1D. The incidence of high energy radiation associated with by-products of cosmic rays may additionally be minimized by minimizing the cross-sectional area of an illumination detector 102 in the plane normal to the zenith. However, the sensor pixel volume also influences device performance characteristics such as the resolution, mean transfer function, full-well potential, dynamic range, speed, and cost; therefore, the minimization of pixel volume to reduce the false count rate may be balanced against these factors.

Further, though not shown, one or more additional radiation sensors of any type (e.g., scintillation sensors, or the like) may be placed around the illumination detector 102 to capture radiation incident on the illumination detector 102 but falling outside the range of solid angles θ captured by the radiation sensor 104.

Figure 4:
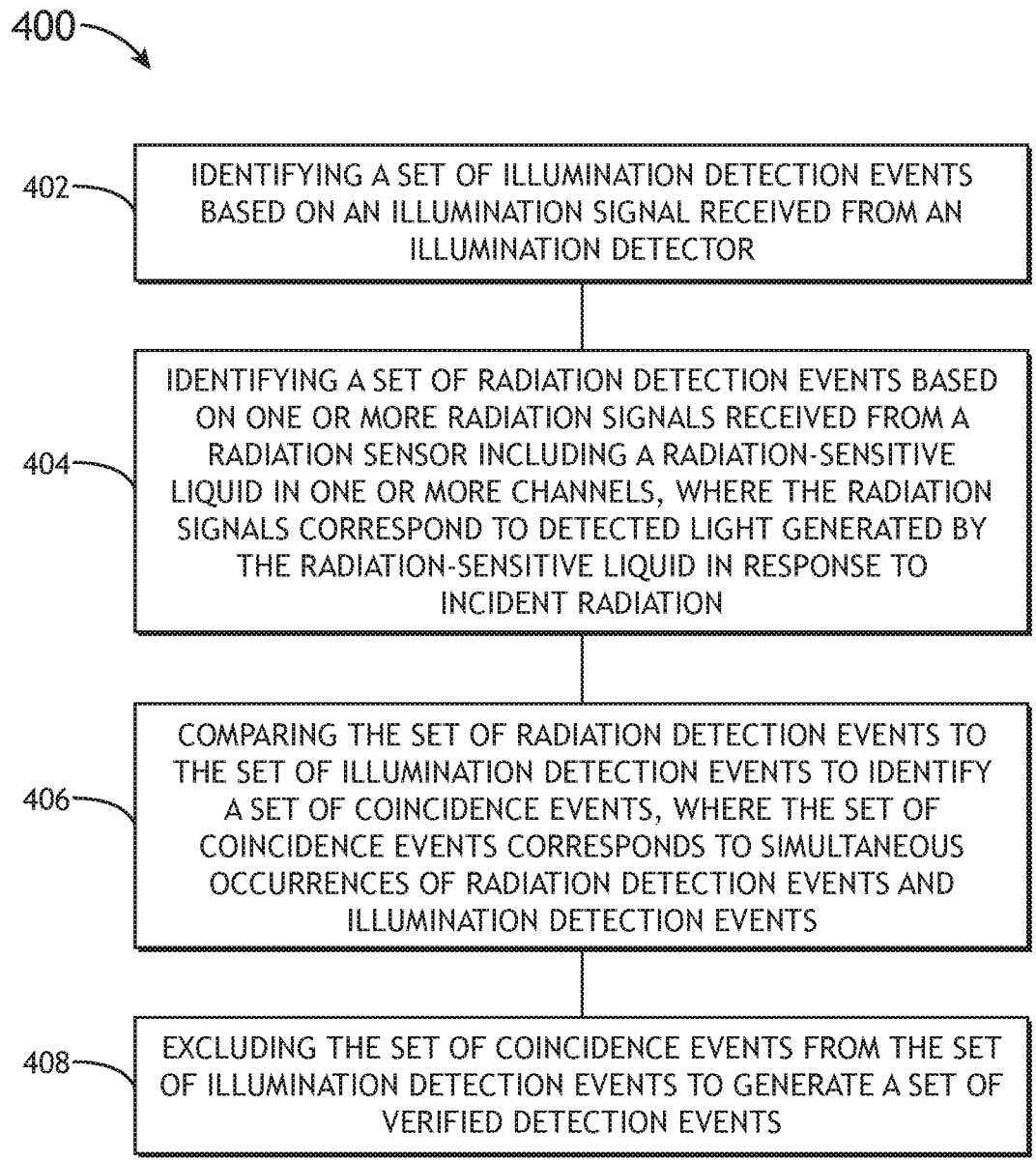
FIG. 4 is a flow diagram illustrating a method for reducing radiation-induced false counts on a detector in an inspection system, in accordance with one embodiment of the present disclosure.

FIG. 4 is a flow diagram illustrating a method 400 for reducing radiation-induced false counts on a detector in an inspection system in accordance with one embodiment of the present disclosure. Applicant notes that the embodiments and enabling technologies described previously herein in the context of the liquid-cooling coincidence detector 100 should be interpreted to extend to method 400. It is further noted, however, that the method 400 is not limited to the architecture of the liquid-cooling coincidence detector 100.

In one embodiment, the method 400 includes a step 402 of identifying a set of illumination detection events based on an illumination signal received from an illumination detector (e.g., the illumination detector 102). In this regard, the illumination detection events may correspond to light measured by the illumination detector 102. As described previously herein, the illumination detection events may include signals of interest (e.g., from a sample) as well as false counts associated with radiation from sources other than the sample. For example, returning to the non-limiting example illustrated in FIG. 2A, an inspection system 200 may include a liquid-cooling coincidence detector 100. Accordingly, the illumination detection events may correspond to measurements by the illumination detector 102 (from the sample 208 or otherwise).

In another embodiment, the method 400 includes a step 404 of identifying a set of radiation detection events based on one or more radiation signals received from a radiation sensor (e.g., radiation sensor 104) including a radiation-sensitive liquid (e.g., radiation-sensitive liquid 118) in one or more channels (e.g., channels 116), where the radiation signals correspond to detected light generated by the radiation-sensitive liquid in response to incident radiation. For example, channels of the radiation sensor may be attached to a backside of the illumination detector such that radiation (e.g., muons, alpha particles, beta particles, gamma rays, or the like) from sources other than the sample that are incident on the illumination detector may also be incident on the radiation sensor.

In another embodiment, the method 400 includes a step 406 of comparing (e.g., with the controller 110) the set of radiation detection events to the set of illumination detection events to identify a set of coincidence events, where the set of coincidence events corresponds to simultaneous occurrences of radiation detection events and illumination detection events.

For example, the channels of the radiation sensor may be thermally coupled to the illumination detector and may extract heat from the illumination detector during operation. In this regard, the radiation sensor may operate as a thermal regulator (e.g., a heat sink) for the illumination detector in addition to generating radiation detection events. For instance, the flowing radiation-sensitive liquid may capture heat from the channels (and thus the illumination detector) and direct the heat away as it is circulated through the channels. Further, placing the radiation-sensitive liquid in direct contact with the illumination detector (e.g., to provide for thermal management of the illumination detector) may facilitate the generation of radiation detection events when a beam of radiation is incident on the illumination detector by providing a large range of solid angles over which radiation is incident on both the radiation sensor and the illumination detector.

In another embodiment, the method 400 includes a step 408 of excluding (e.g., with the controller 110) the set of coincidence events from the set of illumination detection events to generate a set of verified detection events. For example, the verified detection events associated with the inspection system 200 may be associated with identified features on the sample 208.

In another embodiment, the memory medium 114 is configured to store the output of one or more of the various steps described herein.

It is contemplated herein that the relative timing between an illumination detection event of an illumination detector and a radiation detection event of a proximate radiation sensor may be used to determine the presence of a radiation-induced false count. A radiation beam (e.g., radiation beam 138*c*) that interacts with both an illumination detector and a proximate radiation sensor may trigger an event on both sensors and may thus be identified as a false count and excluded. Similarly, detection events on the illumination detector not associated with a corresponding radiation detection event on the radiation sensor may be identified as valid. Furthermore, radiation beams incident on the radiation sensor but not the illumination detector may be disregarded. However, it is recognized herein that it may be possible that a radiation beam may be incident on a radiation sensor at the same time as an illumination event on the illumination detector associated with light from the sample. Under these circumstances, a valid signal may be interpreted as invalid, and such an event may be referred to as a false coincidence event. It is noted herein that the rate of false coincidence events may be, but is not limited to be, dependent on the size of the radiation sensor and/or the separation between the radiation sensor and the illumination detector.

The determination of the set of illumination detection events and/or the set of radiation detection events may be performed using any method known in the art including, but not limited to, a thresholding technique. By way of non-limiting example, the set of radiation detection events may be formed based on a thresholding technique in which a radiation detection event occurs upon the detection of radiation above a certain predetermined value. It is noted herein that the threshold may be adjusted to optimize the ratio of false coincidence events to the false count rejection events, either of which may, but are not limited to, depend on sample type, sample quality, or the local radiation environment.

It is recognized herein that the steps described throughout the present disclosure may be carried out by a variety of system configurations. For example, returning to the inspection system 200 of FIG. 2A as a non-limiting example, the steps described throughout the present disclosure may be carried out by a single controller 110 or, alternatively, multiple controllers 110. It is further noted herein that the one or more controllers may be housed in a common housing or within multiple housings. In this way, any controller or combination of controllers may be separately packaged as a module suitable for integration into a complete inspection system (e.g., inspection system 200). By way of a non-limiting example, a first controller may be configured to perform the step of identifying a set of illumination detection events based on an illumination signal received from the illumination detector. One or more additional controllers may then be configured to perform the steps of: identifying a set of radiation detection events based on one or more radiation signals received from the one or more radiation sensors, comparing the set of radiation detection events to the set of illumination detection events to generate a set of coincidence events, and excluding the set of coincidence events from the set of illumination detection events to generate a set of identified features on the sample.

By way of a second non-limiting example, a first controller may be configured to perform the step of identifying a set of radiation detection events based on one or more radiation signals received from the one or more radiation sensors. One or more additional controllers may be configured to perform the steps of identifying a set of illumination detection events, comparing the set of radiation detection events to the set of illumination detection events to generate a set of coincidence events, and excluding the set of coincidence events from the set of illumination detection events to generate a set of identified features on the sample. In one embodiment, a first controller is configured to perform the step of identifying a set of radiation detection events based on one or more radiation signals received from the one or more radiation sensors. A second controller including one or more field programmable gate arrays (FPGAs) attached to an illumination detector (e.g., illumination detector 102) may be configured to perform the steps of identifying a set of illumination detection events, comparing the set of radiation detection events to the set of illumination detection events to generate a set of coincidence events, and excluding the set of coincidence events from the set of illumination detection events to generate a set of identified features on the sample. It is noted herein that one or more controllers including one or more FPGAs may be integrated into electronics associated with an illumination detector to perform pre-processing of an illumination signal. In this way, a set of radiation detection events may be an input into a pre-processing algorithm such that the output of the pre-processing algorithm is a set of identified features on the sample including corrections for radiation-induced false counts.

In some embodiments, timestamps may be associated with illumination detection events measured by an illumination detector (e.g., illumination detector 102) and/or with radiation detection events measured by a radiation sensor (e.g., radiation sensor 104) for the purpose of identifying false counts in an illumination detector generated by background radiation. For example, referring again to the non-limiting example of the inspection system 200 illustrated in FIG. 2A, an illumination source 202 may be configured to illuminate at least a portion of a sample 208 with an illumination beam 204. A controller 110 may identify a set of radiation detection events based on radiation signals from the radiation sensor 104 and may be further generate a set of radiation timestamps associated with the set of radiation detection events. Similarly, the controller 110 may identify a set of illumination detection events based on the illumination signal received from the illumination detector 102 and may further generate a set of illumination detection event timestamps associated with the set of illumination detection events. In another embodiment, the controller 110 is configured to compare the set of illumination detection event timestamps with the set of radiation detection event timestamps to generate a set of coincidence events based on the detection and radiation timestamps. In another embodiment, the controller 110 is configured to exclude the set of coincidence timestamps to generate a set of identified features on the sample 208 that are associated with identified defect sites on the sample 208.

It is noted herein that an illumination detection event by an illumination detector 102 may be considered a false count if a proximate radiation sensor 104 detects a simultaneous radiation detection event. However, there will be a non-zero time difference between an illumination detection event by an illumination detector 102 and a radiation detection event by a radiation sensor 104, which is related to the propagation time of the beam of radiation between the two sensors. Additionally, factors including, but not limited to, the clock speed of a controller 110, the readout speed of the illumination detector 102, or the readout speed of a radiation sensor 104 may further limit the ability to detect the precise time difference between detection events. An illumination detection event by an illumination detector 102 and a radiation detection event by a radiation sensor 104 may be, but is not limited to be, considered simultaneous if the time difference between the two events is indistinguishable by the inspection system 200. It is noted herein that the requirements for simultaneous detection are not intended to be limiting. For example, the time resolution associated with the detection of simultaneous events may be adjusted in order to adjust the sensitivity of the inspection system 200. By way of a non-limiting example, a time resolution of tens of microseconds associated with the detection of simultaneous events may be sufficient to provide an acceptable false count mitigation rate.

Figure 5:
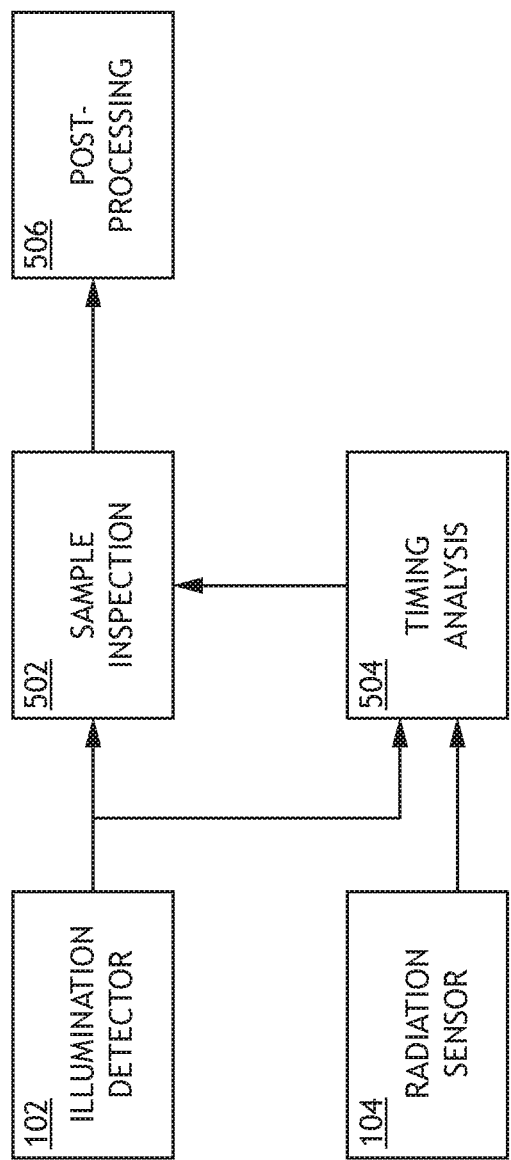
FIG. 5 is a flow diagram illustrating coupling between an illumination detector, a radiation sensor, a sample inspection controller, a timing analysis controller, and a post-processing controller, in accordance with one or more embodiments of the present disclosure.

It is noted herein that the mitigation of radiation-induced false counts need not occur in real time. FIG. 5 is a flow diagram illustrating coupling between an illumination detector, a radiation sensor, a sample inspection controller, a timing analysis controller, and a post-processing controller, in accordance with one or more embodiments of the present disclosure. In one embodiment, an illumination detector (e.g., illumination detector 102) detects illumination from a sample 208 and further transmits an illumination signal to a sample inspection controller 502 configured to inspect a sample 208. The sample inspection controller 502 may perform any type of sample inspection known in the art including, but not limited to, imaging or defect detection. In another embodiment, a timing analysis controller 504 is communicatively coupled to the illumination detector 102 and the radiation sensor 104. In another embodiment, the timing analysis controller 504 receives radiation signals from the radiation sensor 104. In another embodiment, the timing analysis controller 504 further identifies radiation detection events and transmits timing information associated with the radiation detection events to post-processing controller 506. In another embodiment, the timing analysis controller 504 further receives a synchronization signal from the illumination detector in order to correlate radiation detection events with input from the illumination detector. The synchronization signal may include, but is not limited to, illumination acquisition start and stop times. In one embodiment, the post-processing controller 506 correlates timing information associated with radiation detection events to outputs of the sample inspection controller 502 in order to remove false counts associated with the radiation-induced events detected by the illumination detector. In another embodiment, the timing analysis controller 504 provides a list of radiation detection events to the post-processing controller 506 for binning. It is noted herein that the steps performed by controllers 502, 504, and 506 may alternatively be carried out by a single controller (e.g., controller 110) or by any combination of controllers. It is further noted that any controller or combination of controllers may be housed in a common housing or within multiple housings. In this way, the time-based radiation-induced false count mitigation sub-system may be modularized and packaged and integrated into an existing inspection system platform. Therefore, the above description should be interpreted as illustrative rather than limiting.

It is noted herein that the utilization of separate controllers associated with sample inspection controller 502, the timing analysis controller 504, and the post-processing controller 506 may enable the modularization of the time-based radiation-induced false count mitigation system, which may facilitate integration with the hardware and/or software associated with existing wafer inspection systems. In this way, any inspection system known in the art may be improved by the addition of a radiation-induced false count mitigation system. It is further noted herein that additional reduction of radiation-induced false counts in an inspection system may be achieved by additional techniques such as, but not limited to, the incorporation of one or more radiation shields, orienting the illumination detector vertically (e.g., parallel to the zenith), and/or by reducing the pixel volume of the illumination detector as previously described herein.

It is recognized herein that a liquid-cooling coincidence detector 100 may experience false counts. For example, as described previously herein, a radiation beam may be incident on the illumination detector 102 and/or the radiation sensor 104 at the same time as light from a sample hits the illumination detector 102. In one embodiment, two or more liquid-cooling coincidence detectors 100 may be used in a system to further reduce radiation-induced false counts. For example, each liquid-cooling coincidence detector 100 may include an illumination detector 102 and a radiation sensor 104. A false count associated with one liquid-cooling coincidence detector 100 is highly unlikely to occur in a second detector assembly. Accordingly, by utilizing multiple liquid-cooling coincidence detectors 100, the total number of false counts may be further reduced.

In one embodiment, multiple liquid-cooling coincidence detectors 100 are oriented to detect illumination scattered and/or reflected at multiple solid angles. A metric or filter may be utilized to capture known defect types while rejecting the number of false coincidence events based on expected illumination patterns at the multiple solid angles detected by the multiple liquid-cooling coincidence detectors 100.

It is noted that the set of elements of inspection system 200 as described above and illustrated in FIGS. 1A through 5 are provided merely for illustration and should not be interpreted as limiting. It is anticipated that a number of equivalent or additional configurations may be utilized within the scope of the present invention. By way of a non-limiting example, additional elements including, but not limited to, beam blocks or radiation shields 136 may be included in the inspection system 200 in order to prevent unwanted signals that may generate false positives from reaching either the illumination detector 102 or the radiation sensor 104. For example, one or more radiation shields 136 with sufficient thermal and/or electrical properties may be directly bonded to a sensor package (e.g., a ceramic sensor package) to minimize space requirements and/or cost.

All of the methods described herein may include storing results of one or more steps of the method embodiments in a storage medium (e.g., memory medium 114). The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the disclosure is defined by the appended claims.

What is claimed:

1. An inspection system with radiation-induced false count mitigation, comprising:
   an illumination source configured to illuminate a sample;
   a liquid-cooling coincidence detector comprising:
      an illumination detector configured to detect illumination from the sample positioned on a first side of the illumination detector; and
      a radiation sensor, wherein the radiation sensor regulates a temperature of the illumination detector via a liquid circulating through one or more channels disposed on a second side of the illumination detector opposite the first side of the illumination detector, wherein the radiation sensor includes one or more photodetectors configured to detect photons generated in the liquid in response to particle radiation; and
   one or more controllers communicatively coupled to the illumination detector and the one or more photodetectors, wherein the one or more controllers are configured to:
      identify a set of illumination detection events based on an illumination signal received from the illumination detector;
      identify a set of radiation detection events based on one or more radiation signals received from the one or more photodetectors;
      compare the set of radiation detection events to the set of illumination detection events to identify a set of coincidence events, wherein the set of coincidence events corresponds to simultaneous occurrences of radiation detection events and illumination detection events; and
      exclude the set of coincidence events from the set of illumination detection events to generate a set of identified features on the sample.

2. The system of claim 1, wherein the liquid comprises:
   at least one of water, deionized water, glycol, or a fluorocarbon.

3. The system of claim 1, wherein the liquid is configured to generate photons in response to particle radiation comprising:
   at least one of muons, alpha particles, beta particles, or gamma radiation.

4. The system of claim 1, wherein the one or more channels are formed from a metal.

5. The system of claim 4, wherein the one or more channels include one or more transparent windows, wherein the one or more photodetectors detect the photons generated by the liquid in response to particle radiation through the one or more transparent windows.

6. The system of claim 4, wherein the metal comprises:
   stainless steel.

7. The system of claim 1, wherein interior portions of the one or more channels are polished to provide reflections of the photons generated by the liquid in response to particle radiation.

8. The system of claim 1, wherein the one or more photodetectors configured to detect photons generated in the liquid in response to particle radiation comprise:
   at least one of a photodiode, a silicon photo-multiplier, or a multi-pixel photon counter.

9. The system of claim 1, wherein the set of radiation detection events based on one or more radiation signals received from the one or more photodetectors comprise:
   a summed signal from the one or more photodetectors.

10. The system of claim 1, wherein the one or more controllers comprise:
a first controller configured to identify a set of illumination detection events based on an illumination signal received from the illumination detector, and
one or more additional controllers configured to:
identify a set of radiation detection events based on one or more radiation signals received from the one or more photodetectors;
compare the set of radiation detection events to the set of illumination detection events to identify a set of coincidence events, wherein the set of coincidence events corresponds to simultaneous occurrences of radiation detection events and illumination detection events; and
exclude the set of coincidence events from the set of illumination detection events to generate a set of identified features on the sample.

11. The system of claim 1, further comprising:
one or more additional detector assemblies communicatively coupled to the one or more controllers.

12. The system of claim 11, wherein the one or more controllers are further configured to:
generate one or more additional sets of identified features on the sample based on one or more signals received from the one or more additional detector assemblies, and
compare the set of identified features on the sample to the one or more additional sets of identified features on the sample to generate a modified set of identified features on the sample, wherein the modified set of identified features on the sample corresponds to features identified by at least two detector assemblies.

13. The system of claim 1, wherein the liquid-cooling coincidence detector includes one or more radiation shields positioned around one or more surfaces of the illumination detector to block radiation from reaching the illumination detector, wherein the one or more radiation shields are open on the first side of the illumination detector to allow illumination from the sample to pass to the illumination detector.

14. The system of claim 13, wherein the one or more radiation shields are formed from at least one of tungsten or lead.

15. The system of claim 13, wherein at least a portion the one or more radiation shields is further configured as a heat sink.

16. The system of claim 1, wherein the illumination detector comprises:
at least one of one or more single-pixel sensors or one or more multi-pixel sensors.

17. The system of claim 16, wherein the one or more single-pixel sensors comprise:
at least one of one or more photomultiplier tubes (PMTs), one or more photodiodes, or one or more avalanche photodiode (APD) devices.

18. The system of claim 16, wherein the one or more multi-pixel sensors comprise:
at least one of one or more charge-coupled devices (CCDs), or one or more complementary metal-oxide semiconductor (CMOS) devices.

19. The system of claim 1, wherein the illumination detector is positioned vertically.

20. The system of claim 1, wherein the set of identified features on the sample includes one or more defect sites.

21. An inspection system with radiation-induced false count mitigation, comprising:

an illumination source configured to illuminate a sample;
a liquid-cooling coincidence detector comprising:
an illumination detector configured to detect illumination from the sample positioned on a first side of the illumination detector; and
a radiation sensor, wherein the radiation sensor regulates a temperature of the illumination detector via a liquid circulating through one or more channels disposed proximate to a second side of the illumination detector opposite the first side of the illumination detector, wherein the radiation sensor includes one or more photodetectors configured to detect photons generated in the liquid in response to particle radiation; and
one or more controllers communicatively coupled to the illumination detector and the one or more photodetectors, wherein the one or more controllers are configured to:
identify a set of radiation detection events based on one or more radiation signals received from the one or more photodetectors;
generate a set of radiation detection event timestamps associated with the set of radiation detection events;
identify a set of illumination detection events based on the illumination signal received from the illumination detector;
generate a set of illumination detection event timestamps associated with the set of illumination detection events;
compare the set of illumination detection event timestamps to the set of radiation detection event timestamps to generate a set of coincidence events, wherein the set of coincidence events comprises illumination detection events and radiation detection events with matching timestamps; and
exclude the set of coincidence events from the set of illumination detection events to generate a set of identified features on the sample.

22. The system of claim 21, wherein the liquid comprises:
at least one of water, deionized water, glycol, or a fluorocarbon.

23. The system of claim 21, wherein the liquid is configured to generate photons in response to particle radiation comprising:
at least one of muons, alpha particles, beta particles, or gamma radiation.

24. The system of claim 21, wherein the one or more channels are formed from a metal.

25. The system of claim 24, wherein the one or more channels include one or more transparent windows, wherein the one or more photodetectors detect the photons generated by the liquid in response to particle radiation through the one or more transparent windows.

26. The system of claim 24, wherein the metal comprises: stainless steel.

27. The system of claim 21, wherein interior portions of the one or more channels are polished to provide reflections of the photons generated by the liquid in response to particle radiation.

28. The system of claim 21, wherein the one or more photodetectors configured to detect photons generated in the liquid in response to particle radiation comprise:
at least one of a photodiode, a silicon photo-multiplier, or a multi-pixel photon counter.

29. The system of claim 21, wherein the set of radiation detection events based on one or more radiation signals received from the one or more photodetectors comprise:

a summed signal from the one or more photodetectors.

30. The system of claim 21, wherein the one or more controllers include a first controller and one or more additional controllers, wherein the first controller is configured to:
identify a set of radiation detection events based on one or more radiation signals received from the one or more photodetectors; and
generate a set of radiation detection event timestamps associated with the set of radiation detection events, wherein one or more additional controllers are configured to:
identify a set of illumination detection events based on the illumination signal received from the illumination detector;
generate a set of illumination detection event timestamps associated with the set of illumination detection events;
compare the set of illumination detection event timestamps to the set of radiation detection event timestamps to generate a set of coincidence events, wherein the set of coincidence events comprises illumination detection events and radiation detection events with matching timestamps; and
exclude the set of coincidence events from the set of illumination detection events to generate a set of identified features on the sample.

31. The system of claim 21, wherein the one or more controllers are further configured to receive one or more synchronization signals from the illumination detector, and wherein the set of radiation detection event timestamps is synchronized with the one or more synchronization signals.

32. The system of claim 21, further comprising:
one or more additional detector assemblies communicatively coupled to the one or more controllers.

33. The system of claim 32, wherein the one or more controllers are further configured to:
generate one or more additional sets of identified features on the sample based on one or more signals received from the one or more additional detector assemblies; and
compare the set of identified features on the sample to the one or more additional sets of identified features on the sample to generate a modified set of identified features on the sample, wherein the modified set of identified features on the sample corresponds to features identified by at least two detector assemblies.

34. The system of claim 21, wherein the liquid cooling coincidence detector includes one or more radiation shields positioned to block radiation from reaching the illumination detector.

35. The system of claim 34, wherein the one or more radiation shields are comprised of at least one of tungsten or lead.

36. The system of claim 34, wherein at least a portion the one or more radiation shields is further configured as a heat sink.

37. The system of claim 21, wherein the illumination detector comprises at least one of one or more single-pixel sensors or one or more multi-pixel sensors.

38. The system of claim 37, wherein the one or more single-pixel sensors comprise at least one of photomultiplier tubes (PMTs) or photodiodes.

39. The system of claim 37, wherein the one or more multi-pixel sensors comprise at least one of charge-coupled devices (CCDs) or complementary metal-oxide semiconductor (CMOS) devices.

40. The system of claim 21, wherein the illumination detector is positioned vertically.

41. The system of claim 21, wherein the set of identified features on the sample includes one or more defect sites.

42. A method for reducing radiation-induced false counts on a detector in an inspection system, comprising:
identifying, with an illumination detector, a set of illumination detection events based on an illumination signal received from a sample, wherein the sample is positioned on a first side of the illumination detector;
regulating a temperature of the illumination detector with a liquid circulating through one or more channels of a radiation sensor disposed proximate to a second side of the illumination detector opposite the first side of the illumination detector;
identifying a set of radiation detection events based on one or more radiation signals received from one or more photodetectors of the radiation sensor configured to detect photons generated in the liquid in response to particle radiation;
comparing the set of illumination detection events to the set of radiation detection events to generate a set of coincidence events, wherein the set of coincidence events corresponds to simultaneous occurrences of radiation detection events and illumination detection events; and
excluding the set of coincidence events from the set of illumination detection events to generate a set of identified defect sites on the sample.

* * * * *